United States Patent
Liu et al.

(10) Patent No.: US 10,936,311 B1
(45) Date of Patent: Mar. 2, 2021

(54) SPARSE MATRIX PROCESSING CIRCUITRY

(71) Applicant: Xilinx, Inc., San Jose, CA (US)

(72) Inventors: Ling Liu, Saggart (IE); Yifei Zhou, San Jose, CA (US); Xiao Teng, Cupertino, CA (US); Ashish Sirasao, San Jose, CA (US); Chuanhua Song, San Jose, CA (US); Aaron Ng, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 49 days.

(21) Appl. No.: 16/505,987

(22) Filed: Jul. 9, 2019

(51) Int. Cl.
*G06F 9/30* (2018.01)
*G06F 17/16* (2006.01)

(52) U.S. Cl.
CPC ........ *G06F 9/3001* (2013.01); *G06F 9/30036* (2013.01); *G06F 9/30043* (2013.01); *G06F 17/16* (2013.01)

(58) Field of Classification Search
None
See application file for complete search history.

(56) References Cited

U.S. PATENT DOCUMENTS

| | | | | |
|---|---|---|---|---|
| 5,206,822 A | * | 4/1993 | Taylor | G06F 9/383 708/607 |
| 8,775,495 B2 | * | 7/2014 | Lumsdaine | G06K 9/6249 708/520 |
| 9,367,519 B2 | * | 6/2016 | Strauss | G06F 17/16 |
| 9,558,156 B1 | * | 1/2017 | Bekas | G06F 17/16 |
| 10,572,409 B1 | * | 2/2020 | Zejda | G06F 13/20 |
| 10,706,498 B2 | * | 7/2020 | Nurvitadhi | G06F 12/0811 |

OTHER PUBLICATIONS

Ashari et al.; Fast Sparse Matrix-Vector Multiplication on GPUs for Graph Applications; 2014; IEEE (Year: 2014).*
U.S. Appl. No. 15/976,722, filed May 10, 2018, Zejda, Jindrich, et al., San Jose, CA USA.
Fowers, A High Memory Bandwidth FPGA Accelerator for Sparse Matrix-Vector Multiplication, IEEE, 2014.
Wikipedia, Multilayer perceptron, printed on Oct. 23, 2018.
Wikipedia, Sparse matrix, printed on Oct. 23, 2018.

* cited by examiner

*Primary Examiner* — Corey S Faherty
(74) *Attorney, Agent, or Firm* — Crawford Maunu PLLC

(57) ABSTRACT

Disclosed approaches for multiplying a sparse matrix by dense a vector or matrix include first memory banks for storage of column indices, second memory banks for storage of row indices, and third memory banks for storage of non-zero values of a sparse matrix. A pairing circuit distributes an input stream of vector elements across first first-in-first-out (FIFO) buffers according to the buffered column indices. Multiplication circuitry multiplies vector elements output from the first FIFO buffers by corresponding ones of the non-zero values from the third memory banks, and stores products in second FIFO buffers. Row-aligner circuitry organize the products output from the second FIFO buffers into third FIFO buffers according to row indices in the second memory banks. Accumulation circuitry accumulates respective totals from products output from the third FIFO buffers.

20 Claims, 15 Drawing Sheets

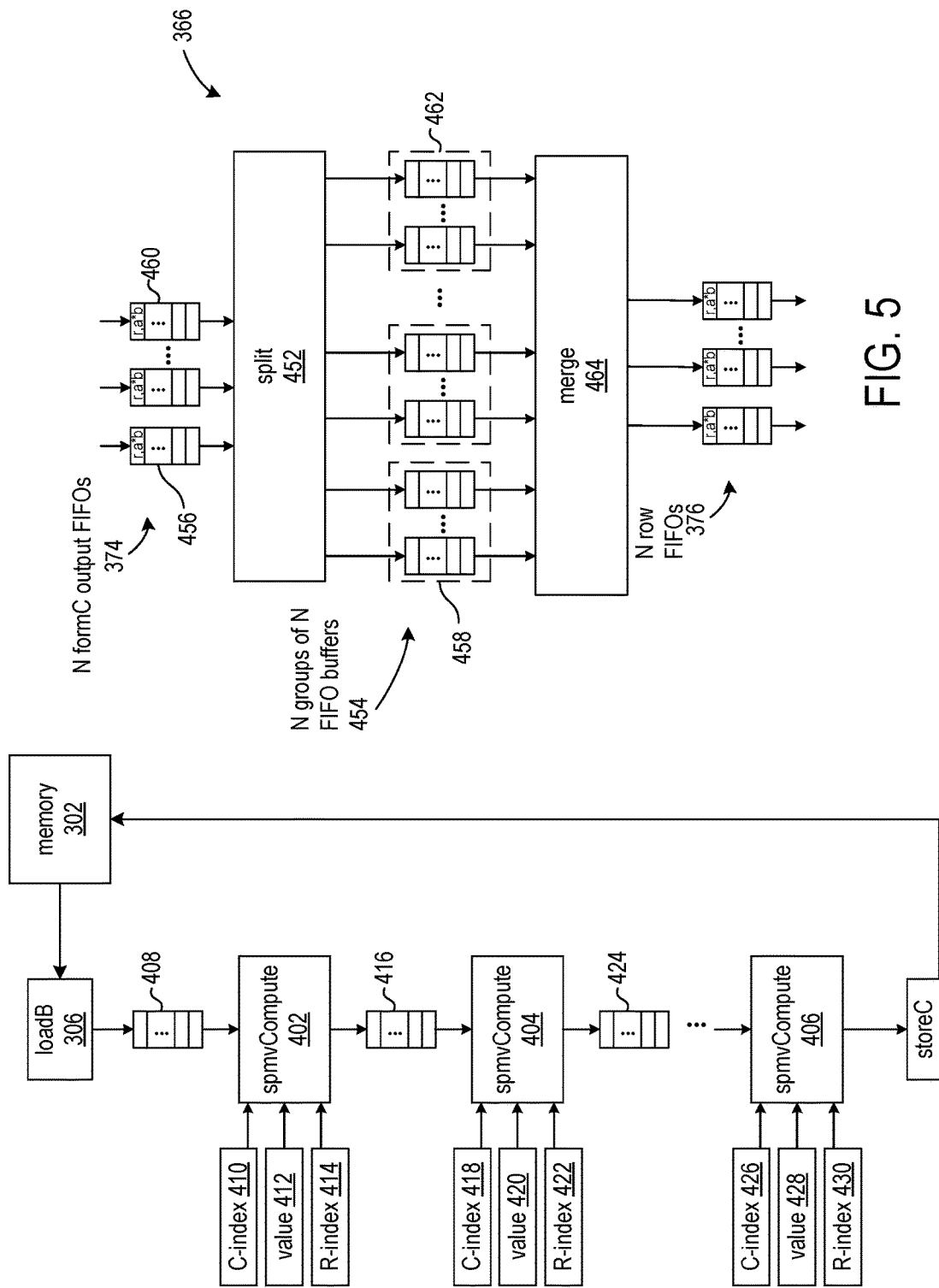

SPARSE MATRIX PROCESSING CIRCUITRY

TECHNICAL FIELD

The disclosure generally relates to multiplication of a sparse matrix by a dense vector.

BACKGROUND

Matrix multiplication is an integral function in machine learning neural networks. In multi-layer perceptron (MLP) networks, matrix multipliers can be connected in a chain, with output vectors of one matrix multiplier being the input vectors to the next matrix multiplier. Some systems implement parallel matrix multiplier circuitry in an attempt to speed processing. Though parallel matrix multiplier circuitry can improve performance, movement of data between random access memory (RAM) resources and on-chip hardware accelerator memory can limit throughput and involve significant circuit and computing resources.

Matrix multiplication in MLP networks often involves sparse matrices. A sparse matrix is a matrix having a large proportion of zero values relative to non-zero values. Matrix multiplications involving a sparse matrix can entail a single sparse matrix-dense vector multiplication (SPMV), multiple sparse matrix-dense vector multiplications (MSPMVs), a single sparse matrix-dense matrix multiplication (SPMM), or multiple sparse matrix-dense matrix multiplications (MSPMMs).

Efforts to improve performance of matrix multiplications have involved a number of approaches. In one approach, an entire input vector is buffered in fast memory (e.g., cache) and the input sparse matrices are streamed from slower memory to the matrix multiplication circuit. In another approach, the sparse matrices are pre-processed and encoded into a hardware-friendly format to speed processing. Another approach limits the input or output of vectors to a rate compatible with the fastest memory.

The prior approaches can involve extra data movement, thereby reducing suitability for MSPMMs. In addition, buffering an entire vector in on-chip memory can limit the size of vectors that can be processed. In addition, prior approaches can involve a custom matrix format, have limited capacity for output vectors, and have an RTL architecture that is difficult to extend and integrate with software systems.

SUMMARY

According to a disclosed circuit arrangement, memory circuitry includes a first plurality of banks configured for storage of column indices, a second plurality of banks configured for storage of row indices, and a third plurality of banks configured for storage of non-zero values of a sparse matrix. The column indices and row indices in corresponding addresses in the first and second pluralities of banks indicate cells of the sparse matrix occupied by the non-zero values in corresponding addresses in the third plurality of banks. A pairing circuit is configured to distribute an input stream of vector elements across a plurality of first first-in-first-out (FIFO) buffers according to the column indices in the first plurality of banks. Multiplication circuitry is configured to multiply vector elements output from the plurality of first FIFO buffers by corresponding ones of the non-zero values from the third plurality of banks, and is configured to store products in a plurality of second FIFO buffers. Row-aligner circuitry is configured to organize each product output from the plurality of second FIFO buffers into one FIFO buffer of a plurality of third FIFO buffers according to a row index corresponding to one of the non-zero values used to generate the product. The row index is indicated by a corresponding one of the row indices in the second plurality of banks. Accumulation circuitry is configured to accumulate respective totals from products output from the plurality of third FIFO buffers.

According to another circuit arrangement, a load-vector circuit is configured to read vector elements from a first memory and put the vector elements in an input vector first-in-first-out (FIFO) buffer. The circuit arrangement includes one or more instances of a compute circuit coupled to the input vector FIFO buffer. The compute circuit includes memory circuitry includes a first plurality of banks configured for storage of column indices, a second plurality of banks configured for storage of row indices, and a third plurality of banks configured for storage of non-zero values of a sparse matrix. The column indices and row indices in corresponding addresses in the first and second pluralities of banks indicate cells of the sparse matrix occupied by the non-zero values in corresponding addresses in the third plurality of banks. A pairing circuit is configured to distribute an input stream of vector elements across a plurality of first first-in-first-out (FIFO) buffers according to the column indices in the first plurality of banks. Multiplication circuitry is configured to multiply vector elements output from the plurality of first FIFO buffers by corresponding ones of the non-zero values from the third plurality of banks, and is configured to store products in a plurality of second FIFO buffers. Row-aligner circuitry is configured to organize each product output from the plurality of second FIFO buffers into one FIFO buffer of a plurality of third FIFO buffers according to a row index corresponding to one of the non-zero values used to generate the product. The row index is indicated by a corresponding one of the row indices in the second plurality of banks. Accumulation circuitry is configured to accumulate respective totals from products output from the plurality of third FIFO buffers.

A disclosed method includes storing column indices of non-zero values of a sparse matrix in a first plurality of banks of memory circuitry, row indices of the non-zero values in a second plurality of banks of memory circuitry, and the non-zero values in a third plurality of banks of memory circuitry. The column indices and row indices are stored in corresponding addresses in the first and second pluralities of banks and indicate cells of the sparse matrix occupied by the non-zero values in corresponding addresses in the third plurality of banks. The method distributes an input stream of vector elements across a plurality of first first-in-first-out (FIFO) buffers according to the column indices in the first plurality of banks. The method multiplies vector elements output from the plurality of first FIFO buffers by corresponding ones of the non-zero values from the third plurality of banks. The method stores products of the multiplying in a plurality of second FIFO buffers and puts each product output from the plurality of second FIFO buffers into one FIFO buffer of a plurality of third FIFO buffers according to a row index corresponding to one of the non-zero values used to generate the product. The row index is indicated by a corresponding one of the row indices in the second plurality of banks. The method accumulates respective totals from products output from the plurality of third FIFO buffers.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which:

FIG. 4B shows an arrangement of multiple instances of the spmvCompute circuit that can be used to perform multiple sparse matrix-dense vector multiplications or multiple sparse matrix-dense matrix multiplications;

FIG. 5 shows circuitry that can implement the rowSplit-Merge circuit of FIG. 4A;

DETAILED DESCRIPTION

Figures 1, 2:
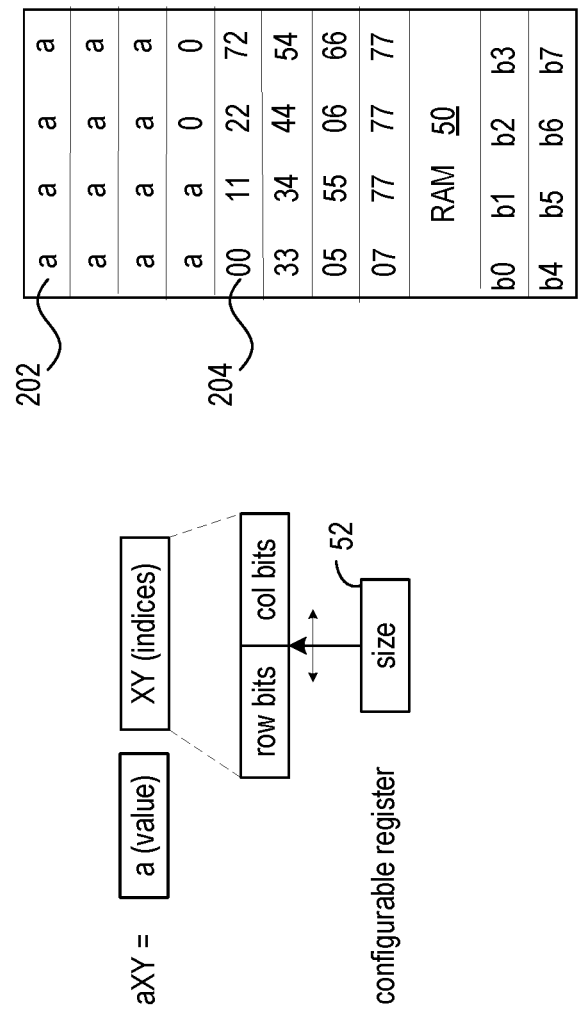
FIG. 1 shows an exemplary sparse matrix A, an exemplary dense vector B, and the resulting vector C, which are presented to aid in describing the disclosed circuits and methods.
FIG. 2 shows an exemplary format of sparse matrix data elements and vector data elements stored in a RAM.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches improve performance of matrix multiplication through reductions in data movement, reductions on limitations on sizes of matrices and vectors, and reductions in overhead associated with preprocessing matrix data for storage. In addition, the disclosed approaches can be easily integrated with software systems. The disclosed approaches allow concurrent execution of multiple sparse matrix-dense matrix multiplications without incurring excess movement of data between off-chip and on-chip memory.

Multiple multiplications of sparse matrices by dense matrices are improved through multiple, chained single multiplications of sparse matrices by dense matrices, with each single multiplication of a sparse matrix by a dense matrix being organized as a set of multiplications of a sparse matrix by a dense vector. The accelerated MSPMM operation can be formally stated as:

$$C0=A0*B0$$

$$C1=A1*C0$$

$$C2=A2*C1$$

$$\ldots$$

$$C(n-1)=A(n-1)*C(n-2)$$

wherein A0, A1, . . . , A(n−1) are sparse matrices, B0 is an input dense matrix, C(n−1) is the output dense matrix, and C0, C1, . . . , C(n−2) are intermediate dense matrices.

An input dense matrix is composed of multiple dense vectors. The number of dense vectors can be configured at runtime, but the number of chained SPMM multiplications is configured when the hardware acceleration circuitry is constructed. A challenge presented by parallelizing multiple SPMM multiplications is data movement. The disclosed approaches limit data movement by separately buffering non-zero values and associated indices and streaming dense vectors through SPMM multiplier circuitry.

According to the disclosed approaches, a base circuit is provided to multiply a sparse matrix by a dense vector. The base circuit arrangement can be configured and/or replicated to perform multiple sparse matrix-dense vector multiplications, a single sparse matrix-dense matrix multiplication, or multiple sparse matrix-dense matrix multiplications.

An exemplary circuit arrangement separately buffers column indices, row indices, and non-zero values of a sparse matrix. The column indices can be buffered in one set of memory banks, the row indices can be buffered in another set of memory banks, and the non-zero values can be buffered in yet another set of memory banks. The column indices, row indices, and non-zero values can be stored at corresponding addresses to indicate associations between the indices and non-zero values.

The circuit arrangement inputs a stream of elements of a vector, and a pairing circuit distributes the vector elements across a first set of first-in-first-out (FIFO) buffers according to the column indices in the memory banks. The vector elements output from the first set of FIFO buffers are input to multiplication circuitry, which reads corresponding non-zero values of the sparse matrix from the memory banks and multiplies the non-zero values by the corresponding vector elements. Output products from the multiplication circuitry are stored in a second set of FIFO buffers.

Row-aligner circuitry organizes each product output from the second set of FIFO buffers into a FIFO buffer of a third set of FIFO buffers according to the row index that corresponds to the non-zero value used to generate the product. The corresponding row index can be determined based on the row indices buffered in the memory banks. Accumulation circuitry accumulates respective totals from products output from the third set of FIFO buffers.

FIG. 1 shows an exemplary sparse matrix A, an exemplary dense vector B, and the resulting vector C, which are presented to aid in describing the disclosed circuits and methods. The matrix data elements are denoted aXY, where X is the row index and Y is the column index of the data element. Each element in the resulting vector C is a dot product of one of the rows of A and the vector data elements b0, . . . , b7, plus an optional, previously accumulated value cX, which can be a previously accumulated partial dot product of the row. The use of previously accumulated cX values need not be present in all applications and depends on the size of the matrix and vector and the hardware resources available for buffering and computing.

FIG. 2 shows an exemplary format of sparse matrix data elements and vector data elements stored in a RAM 50. The notation of the values in RAM 50 correspond to the matrix elements and vector elements of FIG. 1. Values ("a") of the matrix elements are stored in one portion of RAM, and row-column index pairs (XY) are stored in another portion of RAM or in a separate RAM. The "X" portion indicates the row, and the "Y" portion indicates the column.

Each index can be stored in a single addressable data unit. For example, a word of RAM can be split between storing a row value and a column value. Some bits of the word can be dedicated to storing the row value, and the remaining bits can be dedicated to storing the column value. The number of bits allocated to the row value and the column value can be configured by a size register 52 in an exemplary implementation and can be changed according to application requirements. For example, one application may require more bits to represent the row values than to represent the column values, and another application may require more bits to represent the column values than to represent the row values.

The addresses at which the values of matrix elements are stored map to addresses at which corresponding index pairs are stored. For example, the address of the value of matrix element 202 maps to the address of index pair 204. Zero values can be used as padding values at the end of the set of matrix element values to provide a complete set of values to computational circuitry as will be seen in the examples that follow. Though a single RAM is shown, the non-zero elements of the sparse matrix, corresponding indices, and vector elements can be stored in separate addressable RAMS if required to satisfy application objectives.

Figure 3:
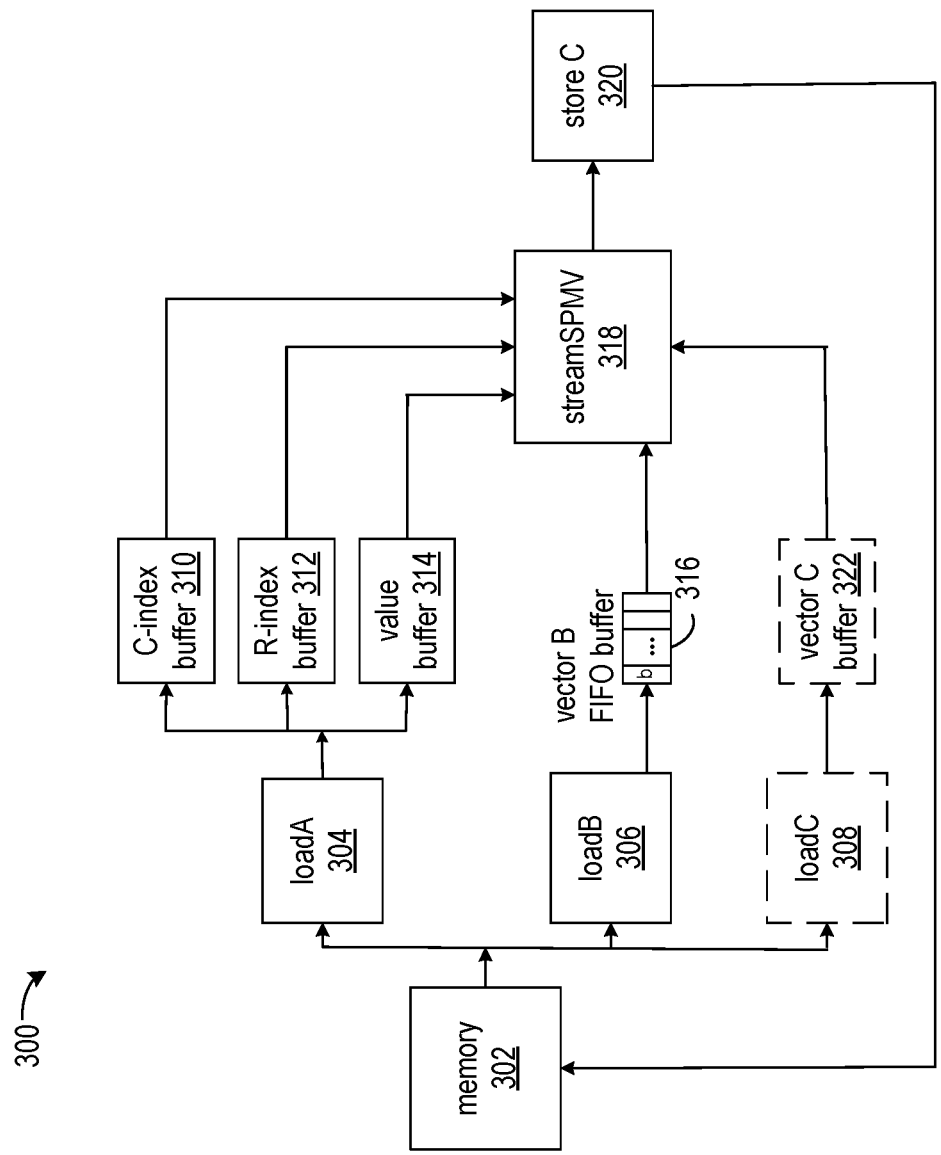
FIG. 3 shows a top-level circuit view of sparse-dense matrix multiplier circuitry.

FIG. 3 shows a top-level circuit view of sparse-dense matrix multiplier circuitry 300. The sparse-dense matrix multiplier circuitry generally can multiply a sparse matrix by a dense vector. In various configurations, the circuitry can perform multiple multiplications of sparse matrices and dense vectors, a multiplication of a sparse matrix by a dense matrix, or multiple multiplications of sparse matrices by dense matrices. Throughput is enhanced by separately buffering column indices, row indices, and values of non-zero elements of the sparse matrix, and inputting a stream of vector elements. The buffering and organization of indices and non-zero elements of the sparse matrix can be in dedicated memory circuitry that can be accessed faster by the computation circuitry than the source sparse matrix data which can be in off-chip memory or if access is provided through a memory controller. In an exemplary application, the sparse-dense matrix multiplier circuitry is implemented as hardwired or programmable logic that is driven by a software application, such as an MLP, executing on a host computer system.

Source sparse matrix data and dense vector/matrix data can be stored in memory 302. In some implementations the sparse-dense matrix multiplier circuitry can be disposed on one integrated circuit (IC) chip or IC package, and the memory 302 can be part of a host computer system, for example. In other implementations, the sparse-dense matrix multiplier circuitry and memory can be part of a system-on-chip (SoC) or system-in-package (SiP), and the loadA circuit 304, loadB cicuit 306, and loadC circuit 308 can be coupled to the memory 302 through a memory controller (not shown), for example.

Prior to commencing a matrix multiplication, various parameters are input to the loadA circuit 304 for purposes of pre-loading the indices and elements of the sparse matrix (or matrices). The parameters, which can be input from an MLP application (not shown), for example, can include the dimensions and address of the sparse matrix. The loadA circuit reads the indices and elements of the sparse matrix data from the memory 302 and stores the column indices of the non-zero elements in C-index buffer 310, stores the row indices of the non-zero elements in R-index buffer 312, and stores the values of the non-zero elements in value buffer 314. Though only one C-index buffer, one R-index buffer, and one value buffer are shown, an implementation can have multiple instances of each buffer to accommodate preloading of multiple sparse matrices.

The loadB circuit 306 inputs parameters that describe the dense vector or dense matrix by which the sparse matrix is to be multiplied. The parameters can indicate the address of the dense vector(s), size of the dense vector(s) and the number of dense vectors. The loadB circuit reads elements of the dense vector and prepares a stream of vector elements by putting the elements in the input vector FIFO buffer 316. With reference to vector B of FIG. 1, the elements are streamed into the input vector FIFO buffer in order of b0, b1, b2, . . . b7.

The streamSPMV circuit 318 inputs the stream of vector elements from the FIFO buffer 316 and references the column indices in the C-index buffer 310 to determine which of the sparse matrix elements in the value buffer 314 are to be multiplied by the input vector elements. The streamSPMV circuit performs those multiplications and then references the row indices in the R-index buffer 312 to organize the products into FIFO buffers (not shown) for accumulation by row. Once the products are organized, the streamSPMV circuit accumulates the products into respective totals of the rows and outputs the row totals as a stream of values to the storeC circuit 320, which writes the results back to the memory 302.

For some applications, the input sparse matrix (or matrices) and or dense vector(s) may be too large to buffer entirely in the buffers 310, 312, and 314. For such applications, the streamSPMV circuit 318 can have a loadC circuit 308 to read back partial results and provide the partial results in the vector buffer circuit 322. The partial results are organized in the vector C buffer 322 by row, and the streamSPMV circuit 318 accumulates the partial row results from the vector C buffer with the products of the rows.

Figure 4A:
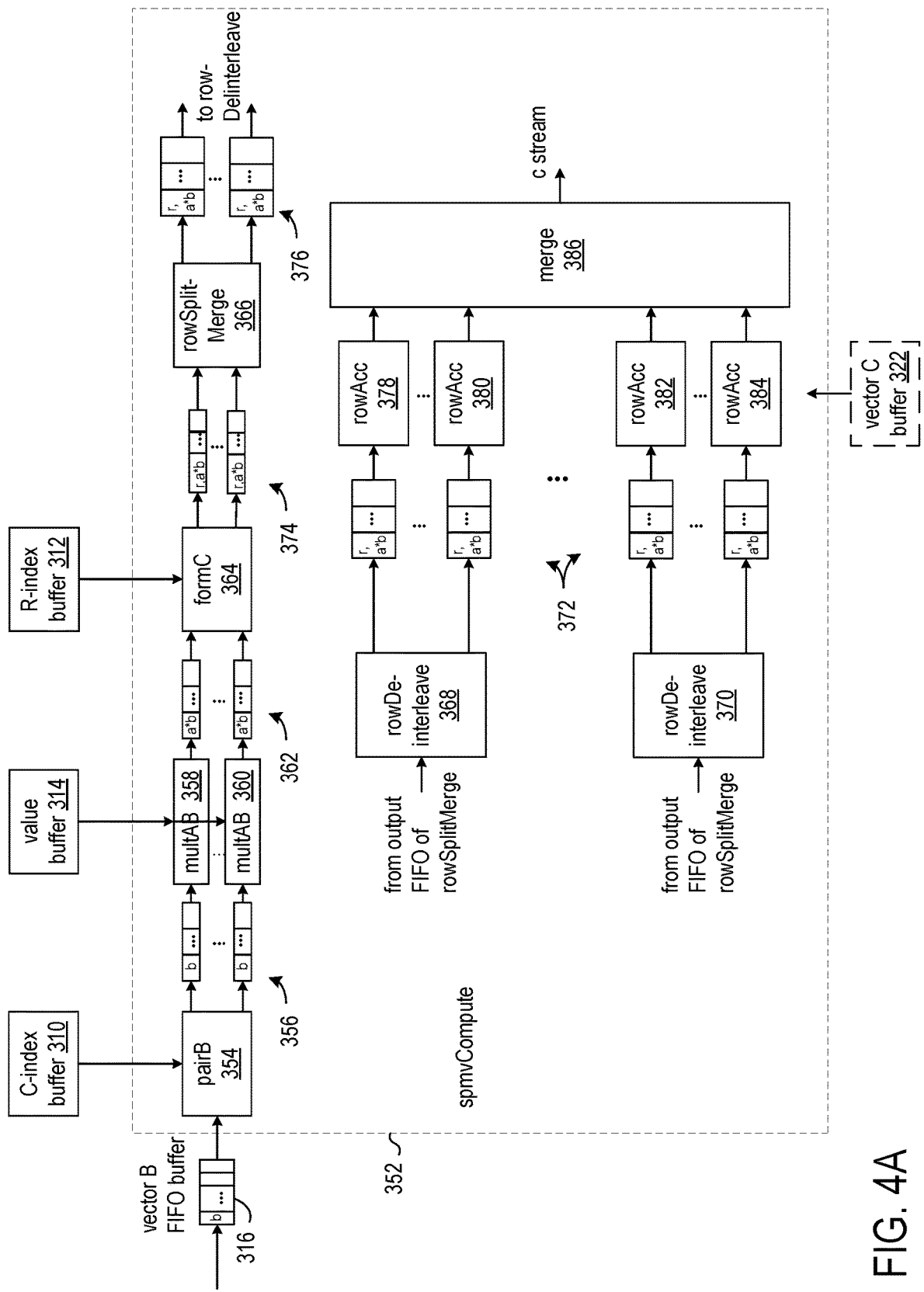
FIG. 4A shows a circuit diagram of an spmvCompute circuit that computes the product of a sparse matrix and dense vector using separately buffered column and row indices, a sparse matrix value buffer, and a streamed dense vector.

FIG. 4A shows a circuit diagram of an spmvCompute circuit 352 that computes the product of a sparse matrix and dense vector using separately buffered column and row indices, a sparse matrix value buffer, and a streamed dense vector. A single instance of the spmvCompute circuit 352 can be used to multiply a sparse matrix by a dense vector.

The single instance can also multiply a sparse matrix by a dense matrix by inputting the columns of the dense matrix as dense vectors.

The spmvCompute circuit includes a pairB circuit 354, and the pairB circuit distributes the input stream of vector elements from the FIFO buffer 316 across multiple FIFO buffers 356 according to the column indices of non-zero elements of the sparse matrix indicated by the C-index buffer 310. A column of the sparse matrix can have more than one non-zero element, and to represent multiple non-zero elements in a column, the C-index buffer stores multiple instances of the column index of the column having multiple non-zero elements. For a column having multiple non-zero elements, the pairB circuit puts multiple instances of the vector element to be multiplied by those non-zero elements in the FIFO buffers 356.

The outputs of the FIFO buffers 356 are coupled to respective multiplier circuits, two of which are shown as multAB circuit 358 and multAB circuit 360. The mutlAB circuits operate in parallel and are coupled to the value buffer 314 and read the values of non-zero elements from the value buffer for multiplication with vector elements output from the FIFO buffers 356. According to an exemplary approach, the value buffer 314 has multiple memory banks, and each bank corresponds to one of the FIFO buffers 356. Each multAB circuit reads a value from one of the banks and multiplies the value by the output value from the corresponding one of the FIFO buffers 356. Each multAB circuit outputs products that are stored in a corresponding one of FIFO buffers 362. In an alternative approach, fewer multiplier circuits can be deployed and time multiplexed to process outputs from more than one of the FIFO buffers 356.

The formC circuit 364, rowSplitMerge circuit 366, and rowDeinterleave circuits 368, . . . , 370 organize the products output from the multAB circuits 358, . . . , 360 into FIFO buffers 372 according to the row indices corresponding to the non-zero values used to generate the products. The row indices are indicated by the corresponding ones of the row indices in the value buffer 314. The formC circuit reads row indices from the R-index buffer 312 and pairs the row indices with the products output from the FIFO buffers 362. According to an exemplary approach, the R-index buffer 312 has multiple memory banks, and each bank corresponds to one of the FIFO buffers 362. Each pair of a row index and product is output to one of the FIFO buffers 374.

The rowSplitMerge circuit rearranges the paired indices and products output from the FIFO buffers 374 into FIFO buffers 376. The paired indices and products are put into the FIFO buffers 374 according to the row indices indicated by the pairs. In the disclosed approach, the number of FIFO buffers 376 is less than the number of rows in the sparse matrix, and the rowSplitMerge circuit uses a modulus function (x MOD y) of the indicated rows to assign the pairs to the FIFO buffers. Thus, each FIFO buffer can have pairs associated with more than one row of the sparse matrix. For example, if there are four FIFO buffers 376 a modulus-4 function (row MOD 4) can be used and one of the FIFO buffers can buffer pairs associated with rows 0 and 4 of the sparse matrix.

The rowDelinterleave circuits 368, . . . , 370 are coupled to respective ones of the FIFO buffers 376. As each of the FIFO buffers 376 can have pairs associated with more than one row of the sparse matrix, the rowDelinterleave circuits can be used to separate the pairs output from each of FIFO buffers 376 into one of FIFO buffers 372 according to the indicated rows of the pairs. Each of FIFO buffers 372 buffers row index-product pairs of one of the rows of the sparse matrix.

An accumulation circuit can be associated with and accumulate the products output from each of the FIFO buffers 372. The exemplary accumulation circuits operate in parallel and include rowAcc circuits 378, 380, . . . , 382, 384. Each rowAcc circuit accumulates a respective total of the products output from one of the FIFO buffers 372 and outputs the total for that row to the merge circuit 386. The merge circuit generates a stream of respective totals and outputs the stream. For sparse matrices and vectors that are too large to buffer, the rowAcc circuits can input partially accumulated values from the vector buffer 322 and accumulate the partially accumulated values with the products from the FIFO buffers 372. The output stream can be stored in an output FIFO buffer (not shown) which can be directed back to memory 302 (FIG. 3) or as input to another instance of the spmvCompute circuit 352.

FIG. 4B shows an arrangement of multiple instances 402, 404, . . . , 406 of the spmvCompute circuit that can be used to perform multiple sparse matrix-dense vector multiplications or multiple sparse matrix-dense matrix multiplications. Multiple instances of the spmvCompute circuit can be chained so that the output from one instance is provided as the input to the next instance in the chain.

The instances 402, 404, . . . , 406 of the spmvCompute circuit can perform multiple sparse matrix-dense vector multiplications by way of the loadB circuit 306 inputting a single initial input vector into FIFO buffer 408. The spmvCompute instance 402 performs a first sparse matrix-dense vector multiplication of the sparse matrix stored in value buffer 412 by the vector from the FIFO buffer 408, using the indices in C-index buffer 410 and R-index buffer 414. The output dense vector from spmvCompute instance 402 is stored in FIFO buffer 416, which is also the dense input vector to spmvCompute instance 404. The spmvCompute instance 404 performs a second sparse matrix-dense vector multiplication of the sparse matrix stored in value buffer 420 by the vector from the FIFO buffer 416, using the indices in C-index buffer 418 and R-index buffer 422. The output dense vector from spmvCompute instance 404 is stored in FIFO buffer 424, which is also the dense input vector to the next spmvCompute instance (not shown) in the chain.

The spmvCompute instance 406 can perform a last sparse matrix-dense vector multiplication of the sparse matrix stored in value buffer 428 by the vector from the FIFO buffer 424, using the indices in C-index buffer 426 and R-index buffer 430. The output dense vector from spmvCompute instance 406 can be provided to the storeC circuit 320 for storage back to memory 302.

The circuit arrangement of multiple instances 402, 404, . . . , 406 of the spmvCompute circuit can be configured to perform multiple sparse matrix-dense matrix multiplications. Input parameters to the loadB circuit 306 can specify a dense matrix (instead of a single vector). In response, the loadB circuit loads successive vectors (columns) of the dense matrix into the FIFO buffer 408. The spmvCompute instance 402 performs a first sparse matrix-dense matrix multiplication by multiplying the successively input vectors by the non-zero values of the sparse matrix elements in value buffer 412. The output vectors from spmvCompute instance 402 are a dense matrix, which the spmvCompute instance 404 multiplies by the non-zero values of another sparse matrix in value buffer 420. The spmvCompute instance 406 performs the last of the multiple sparse matrix-dense matrix multiplications.

FIG. 5 shows circuitry that can implement the rowSplitMerge circuit 366 of FIG. 4A. The rowSplitMerge circuit rearranges the paired indices and products output from the FIFO buffers 374 into FIFO buffers 376 according to the row indices indicated by the pairs.

Split circuit 452 loads the pairs of row indices and products into selected ones of N groups of N FIFO buffers 454. N is the number of parallel streams chosen for the implementation and can be a modulus function applied to the number of rows of the sparse matrix. Each of FIFO buffers 374 is associated with one group of the N groups of FIFO buffers 454. For example, FIFO buffer 456 is associated with group 458, and FIFO buffer 460 is associated with FIFO buffer 462.

A row index-product pair is stored into one FIFO buffer of the N FIFO buffers in one of the groups based on the row index. Thus, circuit 452 splits the row index-product pair into separate data streams based on the row indices. Each row of the sparse matrix is associated with one of the N FIFO buffers in each of the N groups. The one FIFO buffer can be selected based on the function: row MOD N, where row is the row index. As each group of FIFO buffers includes N FIFO buffers and each row index-product pair is stored into only one of the N FIFO buffers in a group, some of the FIFO buffers in the group will have empty slots.

Merge circuit 464 merges the row index-product pairs from the N groups of N FIFO buffers into N FIFO buffers 376. Row index-product pairs having the same row value are stored in the same one of the N FIFO buffers 376. In applications in which the number of rows in the sparse matrix is greater than N, one or more of the FIFO buffers 376 can store row index-product pairs of different rows.

Figure 6:
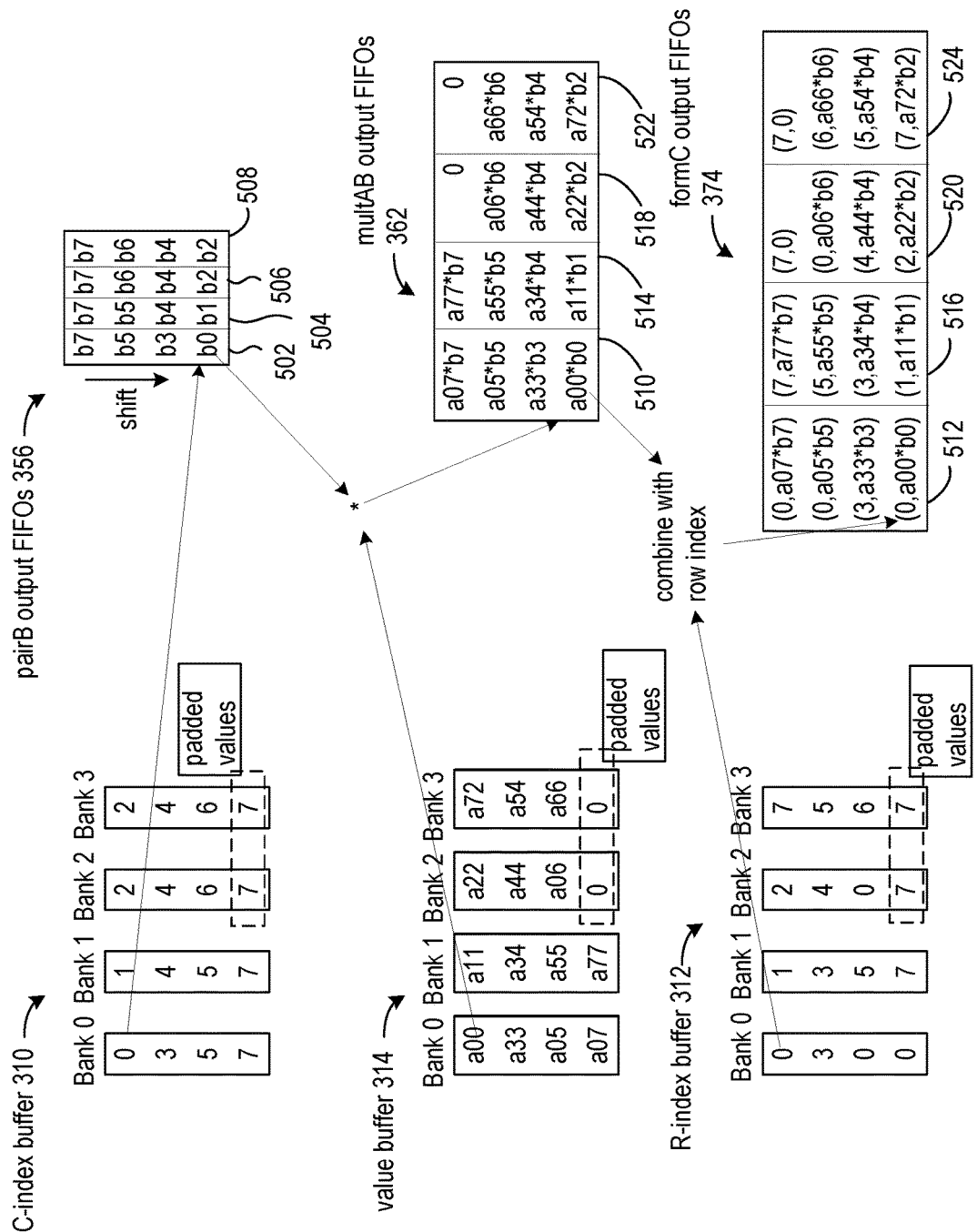
FIG. 6 shows the contents of the C-index buffer, value buffer, R-index buffer, and the FIFO buffers generated by the spmvCompute circuit according to the exemplary sparse matrix A and dense vector B of FIG. 1.

FIG. 6 shows the contents of the C-index buffer 310, value buffer 314, R-index buffer 312, and the FIFO buffers 356, 362, and 374 generated by the spmvCompute circuit 352 according to the exemplary sparse matrix A and vector B of FIG. 1. In an exemplary implementation, each of the buffers consists of four memory banks, and each of the banks can be a separate addressable memory circuit.

The non-zero elements are stored across the banks of the value buffer 314 in column order. That is the elements of the sparse matrix are stored in the order of non-zero elements of column 0, followed by non-zero elements of column 1, followed by non-zero elements of column 2 and so on. In the example, element a00 is stored first in bank 0, element a11 is stored first in bank 1, element a22 is stored first in bank 2, element a72 is stored first in bank 3, element a33 is stored second in bank 0, element a34 is stored second in bank 1 and so on.

The C-index buffer 310 and R-index buffer 312 can have the same number of banks as the value buffer 314. The column and row indices of the non-zero elements are stored in the C-index buffer 310 and R-index buffer 312 in banks and addresses that correspond to the banks and address of the values of the non-zero elements in the value buffer 314. The buffers 310, 312, and 314 can be padded with values if the number of non-zero elements is not evenly divisible by the number of banks.

The FIFO buffers 356 are populated by the pairB circuit 354 (FIG. 3) with vector values to be multiplied by the non-zero elements of the sparse matrix. The number of FIFO buffers 356 can be equal to the number banks of the buffers 310, 312, and 314.

The pairB circuit reads the column indices from corresponding addresses of the banks and puts vector elements in the FIFO buffers 356 based on the values of the column indices. For example, the first set of column indices read from the banks of the C-index buffer 310 are 0, 1, 2, and 2, and in response to those column indices, the pairB circuit puts vector elements b0, b1, b2, and b2 in the FIFO buffers 356, which are shown to be the first vector elements input to the FIFO buffers. The same vector value can be put in different ones of the FIFO buffers 356 if a column of the sparse matrix has multiple non-zero elements. For example, column 2 of the sparse matrix has non-zero elements a22 and a72, which is indicated by the first column indices in banks 2 and 3 of the C-index buffer. The pairB circuit continues to push vector elements into the FIFO buffers until the last of the column indices have been processed (column indices 7, 7, 7, 7).

Multiplier circuitry, such as the multAB circuits 358, . . . 360 of FIG. 3) multiplies the vector elements output from the FIFO buffers 356 by the non-zero elements in corresponding banks of the value buffer 314. Vector elements output from FIFO buffer 502 are multiplied by non-zero elements from bank 0, vector elements from FIFO buffer 504 are multiplied by non-zero elements from bank 1, vector elements from FIFO buffer 506 are multiplied by non-zero elements from bank 2, and vector elements from FIFO buffer 508 are multiplied by non-zero elements from bank 3. The multiplier circuitry puts the products in corresponding ones of the FIFO buffers 362 as shown by the product labels.

The formC circuit 364 (FIG. 3) pairs the products from the FIFO buffers 362 with corresponding row indices from the banks of the R-index buffer 312 and stores the paired information in corresponding ones of the FIFO buffers 374. Products output from FIFO buffer 510 are combined with row indices from bank 0 and put in FIFO buffer 512, products output from FIFO buffer 514 are combined with row indices from bank 1 and put in FIFO buffer 516, products output from FIFO buffer 518 are combined with row indices from bank 2 and put in FIFO buffer 520, and products output from FIFO buffer 522 are combined with row indices from bank 3 and put in FIFO buffer 524.

Figure 7:
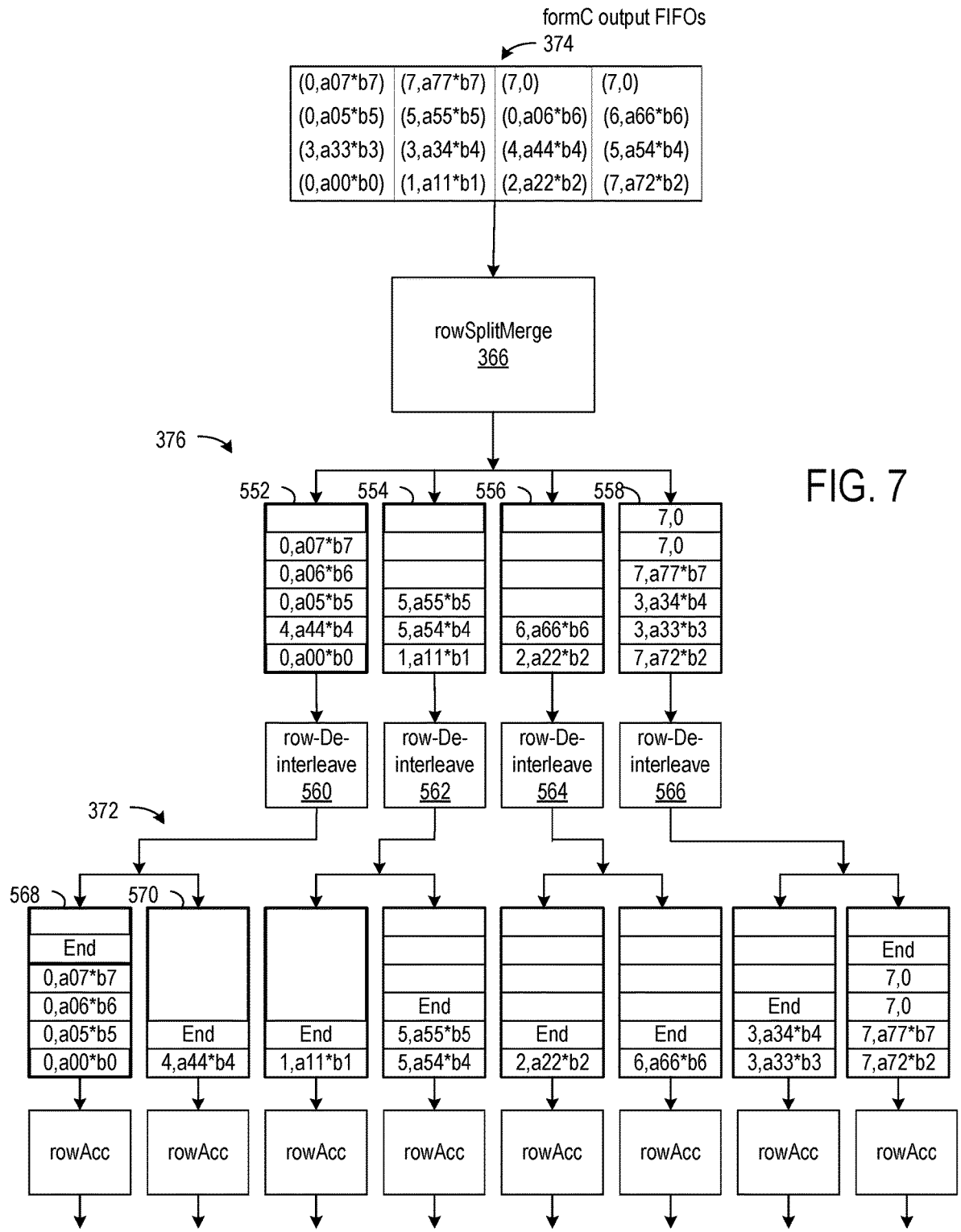
FIG. 7 continues the example shown in FIG. 6, showing the output FIFO buffers from the RowSplitMerge circuit and output FIFO buffers from the rowDelinterleave circuits.

FIG. 7 continues the example shown in FIG. 6, showing the output FIFO buffers from 376 the RowSplitMerge circuit 366 and output FIFO buffers 372 from the rowDelinterleave circuits. The rowSplitMerge circuit rearranges the paired indices and products output from the FIFO buffers 374 into FIFO buffers 376 according to the row indices indicated by the pairs. In the example there are 4 FIFO buffers 552, 554, 556, and 558, and the rowSplitMerge circuit uses a row MOD 4 function to assign the pairs to the FIFO buffers. Pairs associated with rows 0 and 4 are shifted through FIFO buffer 552, pairs associated with rows 1 and 5 are shifted through FIFO buffer 554, pairs associated with rows 2 and 6 are shifted through FIFO buffer 556, and pairs associated with rows 3 and 7 are shifted through FIFO buffer 558.

The rowDelinterleave circuits 560, 562, 564, and 566 are coupled to the FIFO buffers 552, 554, 556, and 558, respectively. As each of the FIFO buffers 376 can have pairs associated with more than one row of the sparse matrix, the rowDelinterleave circuits separate the pairs output from each of FIFO buffers 376 into one of FIFO buffers 372 according to the indicated rows of the pairs. For example, the rowDeinterleave circuit 560 separates the pairs output from FIFO buffer 552 into FIFO buffers 568 and 570. The rowACC circuits accumulate respective totals of the products output from the FIFO buffers 372.

Figure 8:
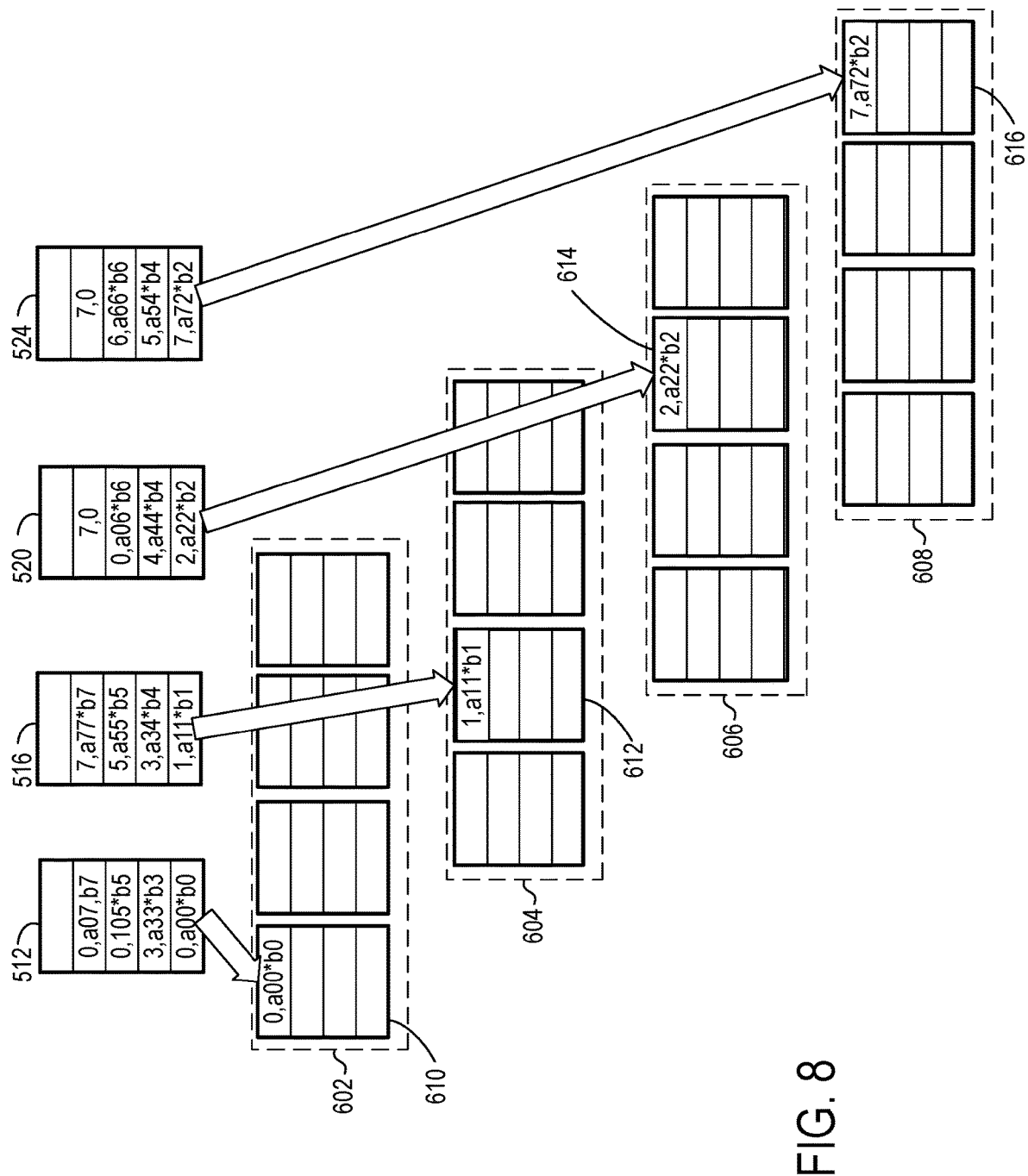
FIG. 8 shows splitting of the paired row index-product elements into N groups of N FIFO buffers according to rows of the matrix data elements.

FIGS. 8-12 further elaborate the operation of the rowSplitMerge circuit with the example of FIGS. 6 and 7. FIG. 8 shows splitting of the paired row index-product elements into N groups of N FIFO buffers according to rows of the matrix data elements. The rowSplitMerge circuit 366 selects one of the FIFO buffers in group 602 for shifting-in the index-product pairs from FIFO buffer 512, selects one of the FIFO buffers in group 604 for shifting-in the index-product pairs from FIFO buffer 516, selects one of the FIFO buffers in group 606 for shifting-in the index-product pairs from FIFO buffer 520, and selects one of the FIFO buffers in group 608 for shifting-in the index-product pairs from FIFO buffers 524.

The selection of the FIFO buffer within each group is based on the row index of the index-product pair. For N FIFO buffers within a group referenced by 0 through N−1, the FIFO buffer can be selected as (row MOD N), where row is the value of the row index and MOD is a modulo function or other mapping function. FIFO buffer 610 of group 602 is selected for paired index-product 0,a00*b0, FIFO buffer 612 of group 604 is selected for paired index-product 1,a11*b1, FIFO buffer 614 of group 606 is selected for paired index-product 2,a22*b2, and FIFO buffer 616 of group 608 is selected for paired index-product 7,a72*b2. The paired index-product data are shifted into the selected FIFO buffers.

Figure 9:
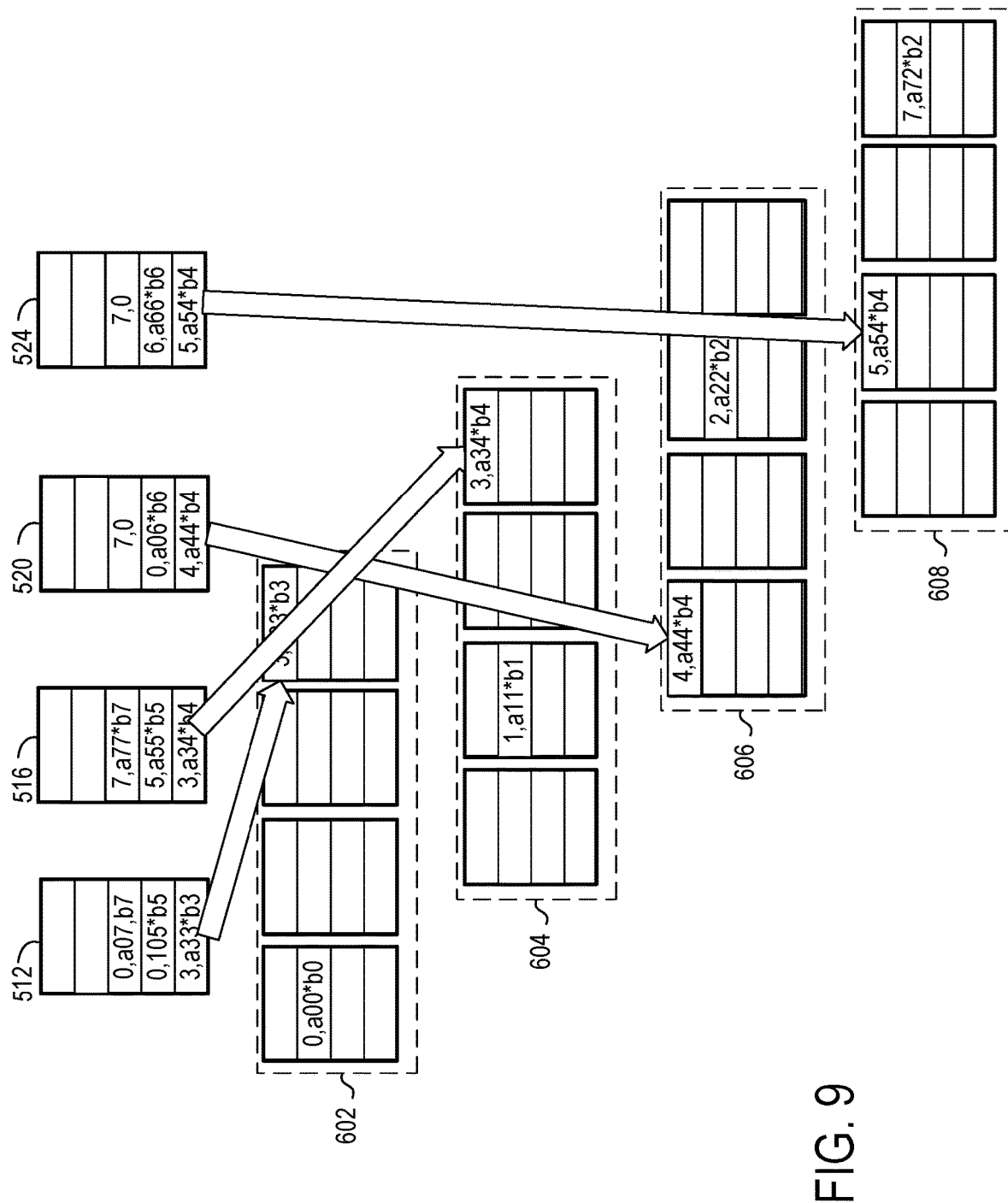
FIGS. 9, 10, and 11 continue the example of FIG. 8 with the splitting of the paired index-product elements into the four FIFO buffers of the four groups.
Figure 10:
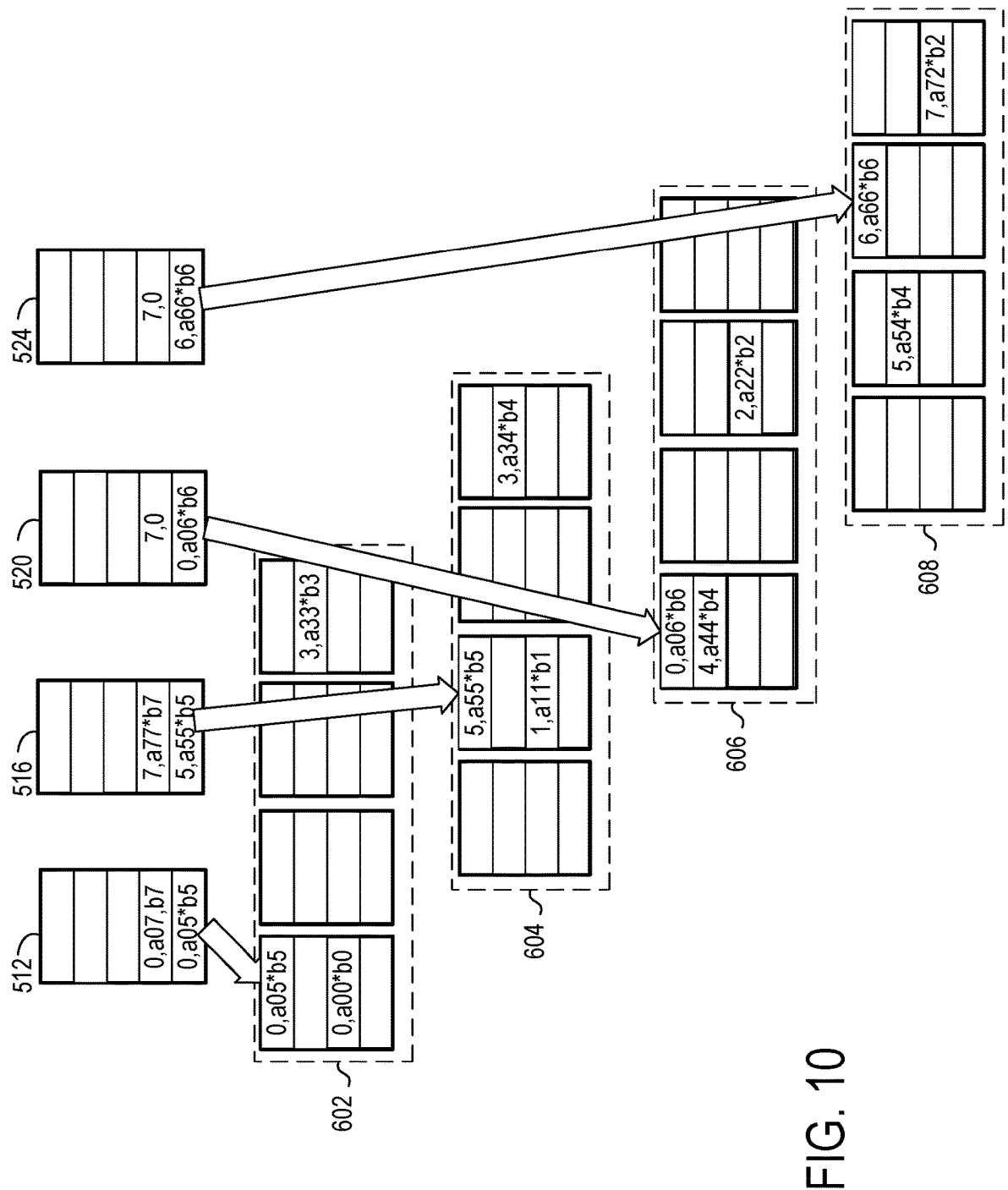
Figure 11:
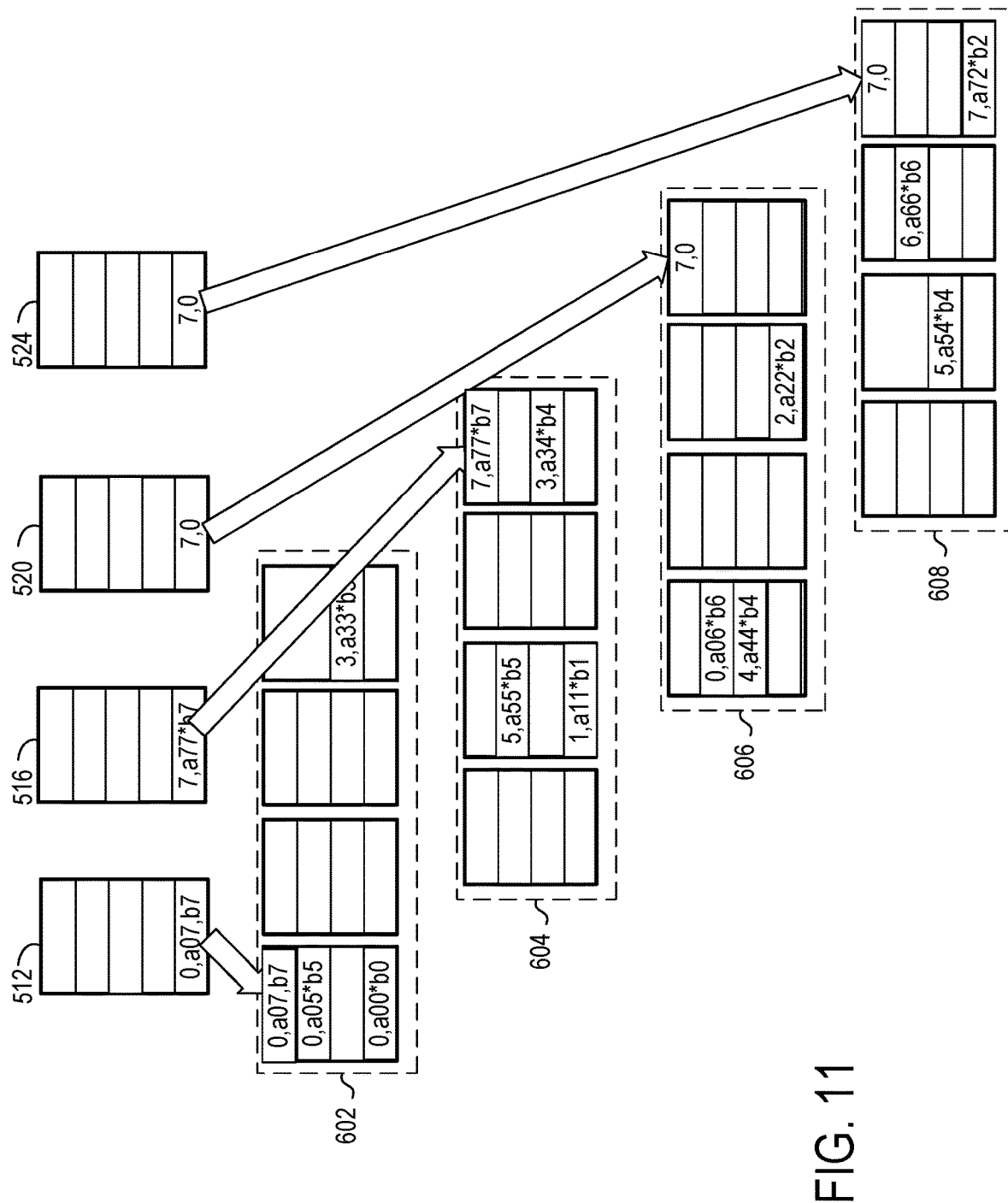

FIGS. 9, 10, and 11 continue the example of FIG. 8 with the splitting of the paired index-product elements into the four FIFO buffers of the four groups.

Figure 12:
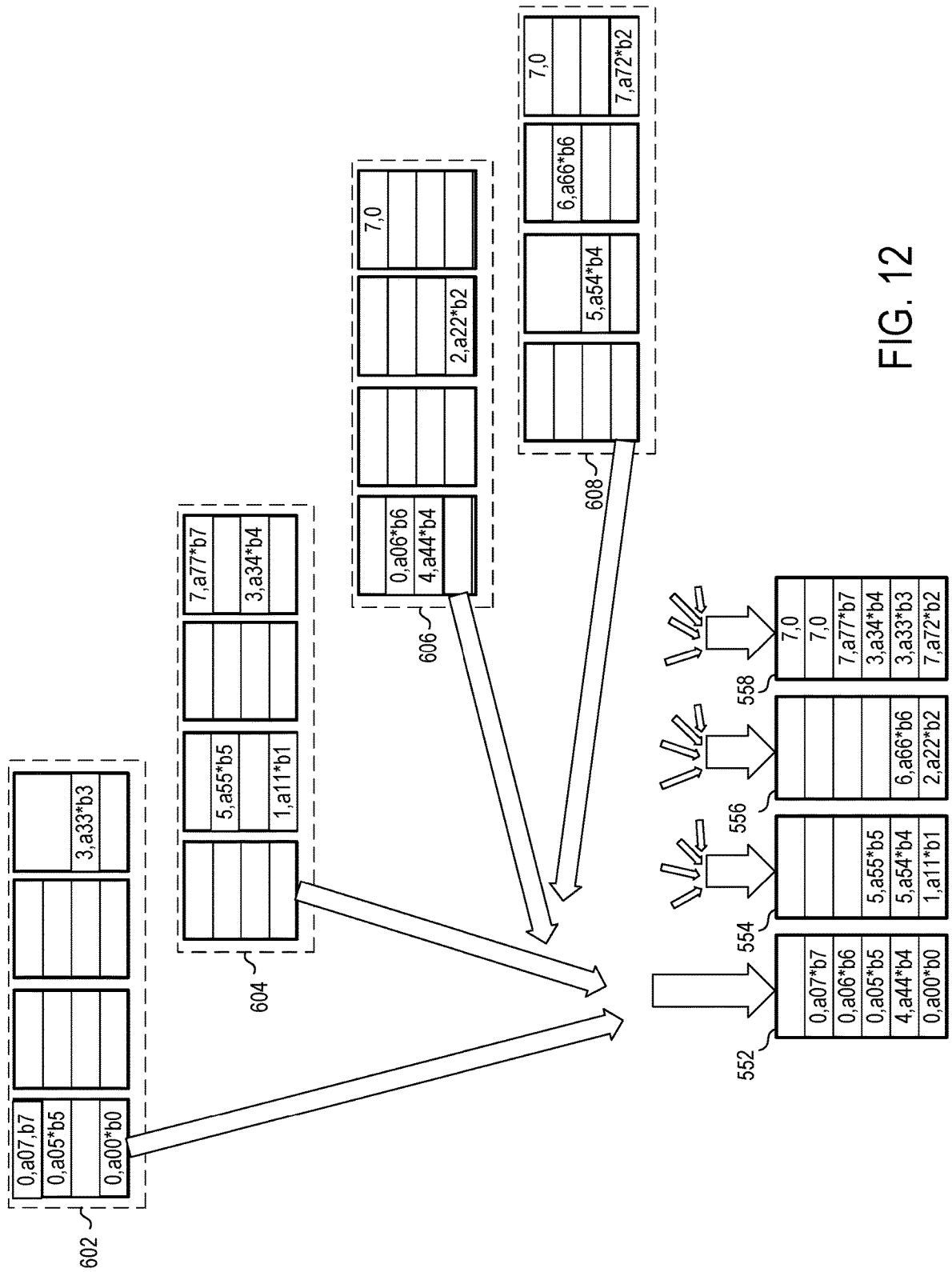
FIG. 12 shows merging of the paired index-product elements from the four groups of four FIFO buffers of FIG. 11 into four FIFO buffers.

FIG. 12 shows merging of the paired index-product elements from the four groups of four FIFO buffers of FIG. 11 into four FIFO buffers. Specifically, FIG. 12 shows the state of the four groups 602, 604, 606, and 608 of FIFO buffers after having shifting in all the paired index-product elements, and shows the state of the four FIFO buffers 552, 554, 556, and 558 after having merged the paired elements from the 4 groups of FIFO buffers into the 4 FIFO buffers.

The merge circuit 464 (FIG. 5) selects from the first FIFO buffer in each group for shifting a paired index-product into FIFO buffer 552, selects from the second FIFO buffer in each group for shifting a paired index-product into FIFO buffer 554, selects from the third FIFO buffer in each group for shifting a paired index-product into FIFO buffer 556, and selects from the fourth FIFO buffer in each group for shifting a paired index-product into FIFO buffer 558.

Figure 13:
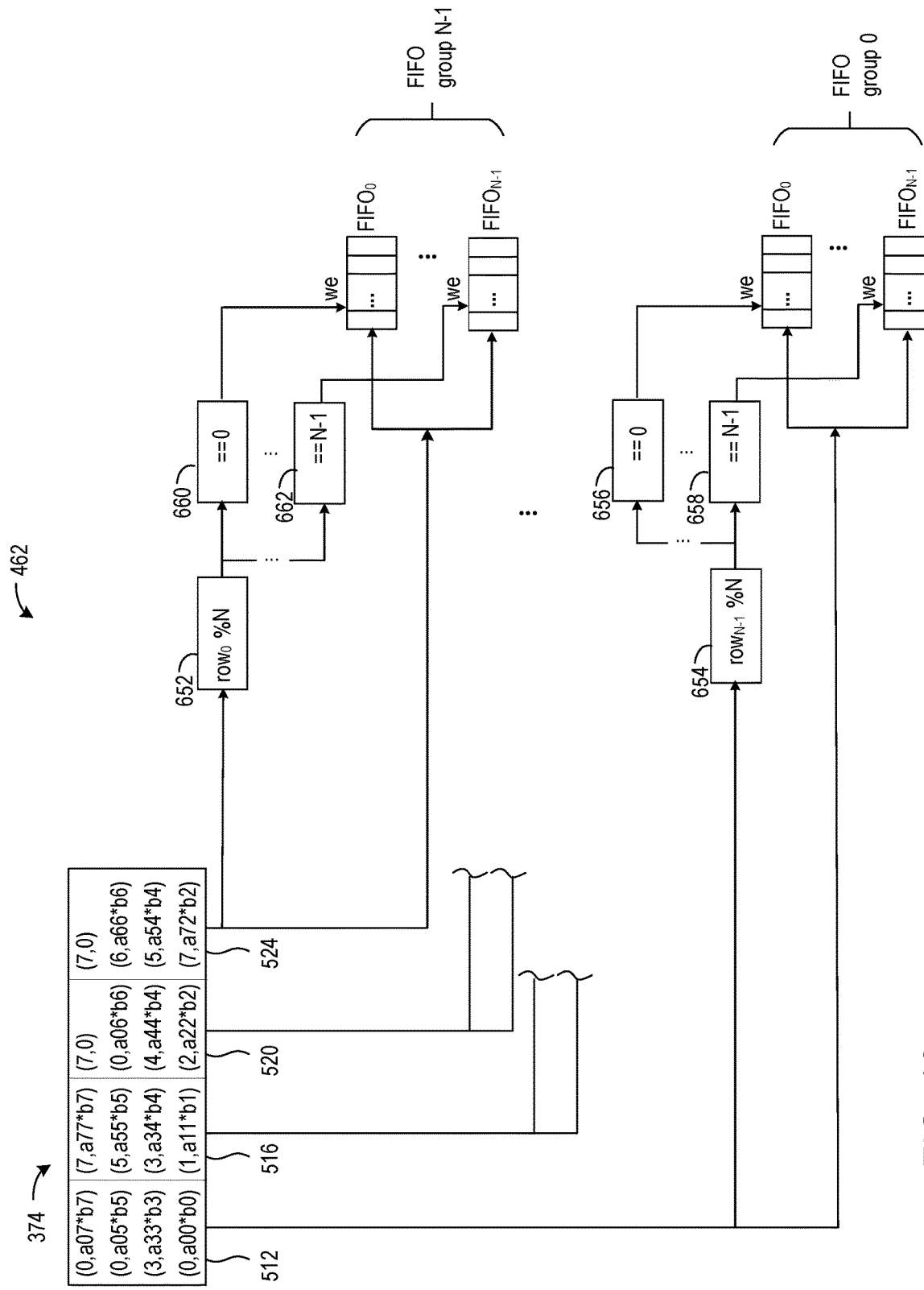
FIG. 13 shows circuitry that splits the outputs from the FIFO buffers output from the formC circuit across N groups of N FIFO buffers according to row indices associated with the products.

FIG. 13 shows circuitry that splits the outputs from the FIFO buffers 374 output from the formC circuit 364 across N groups of N FIFO buffers according to row indices associated with the products. Each of FIFO buffers 512, 516, 520, and 524 is associated with one of the groups of FIFO buffers, and the row index value is used to select and enable storing to one of the FIFO buffers in the group. In the exemplary circuit, FIFO buffer 512 is associated with FIFO group 0, . . . , and FIFO buffer 524 is associated with FIFO group N−1.

The row index of each index-product pair is input to a modulo circuit. For example, row 7 of index-product pair (7,a72*b2) is input to modulo circuit 652, and row 0 of index-product pair (0,a00*b0) is input to modulo circuit 654. Each modulo circuit computes index MOD N. The value output from each modulo circuit is input to multiple comparator circuits, and each comparator circuit compares the input value to one of the values from 0 to N−1. The output from each comparator circuit is a write enable signal to one of the N FIFO buffers within one of the N groups of FIFO buffers. For example, comparator circuit 656 provides the write enable signal to FIFO buffer 0 in group 0, . . . , and comparator circuit 658 provides the write enable signal to FIFO buffer N−1 in FIFO group 0. Similarly, comparator circuit 660 provides the write enable signal to FIFO buffer 0 in group N−1, . . . , and comparator circuit 662 provides the write enable signal to FIFO buffer N−1 in FIFO group N−1.

Figure 14:
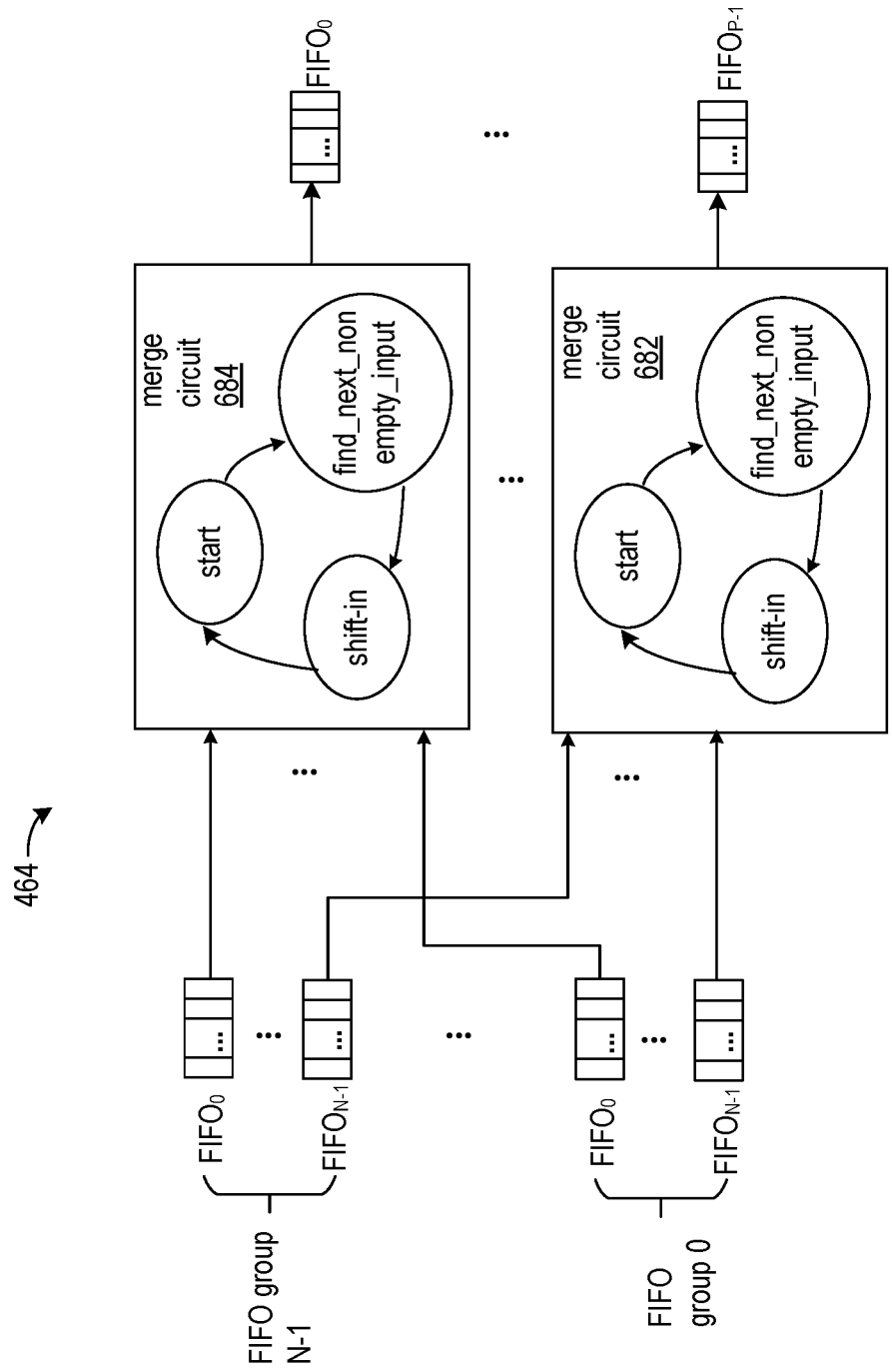
FIG. 14 shows a circuit diagram of circuit, which merges matrix data elements from the N groups of N FIFO buffers into N FIFO buffers.

FIG. 14 shows a circuit diagram of circuit 464, which merges matrix data elements from the N groups of N FIFO buffers into N FIFO buffers. Circuit 464 includes multiple merge circuits 682, . . . , 684. Each merge circuit is coupled to receive index-product pairs from one of the N FIFO buffers in each of the N groups. For example, merge circuit 682 is coupled to receive index-product pairs from FIFO buffer N−1 in each of FIFO groups 0 through N−1, and merge circuit 684 is coupled to receive index-product pairs from FIFO buffer 0 in each of the FIFO groups 0 through N−1.

Each merge circuit can be implemented as a state machine that takes index-product pairs from the multiple inputs and shifts the index-product pairs into the associated FIFO buffer. The merge circuit can service the inputs according to a round-robin schedule, for example. For example, the merge circuit can cycle through the inputs from 0 to N−1 checking for a non-empty input from the FIFO buffers. The merge circuit can then shift the matrix data element from the first-encountered non-empty input into the FIFO buffer. After shifting the index-product pairs into the FIFO buffer, the merge circuit can repeat the cycle looking for the next non-empty input.

Figure 15:
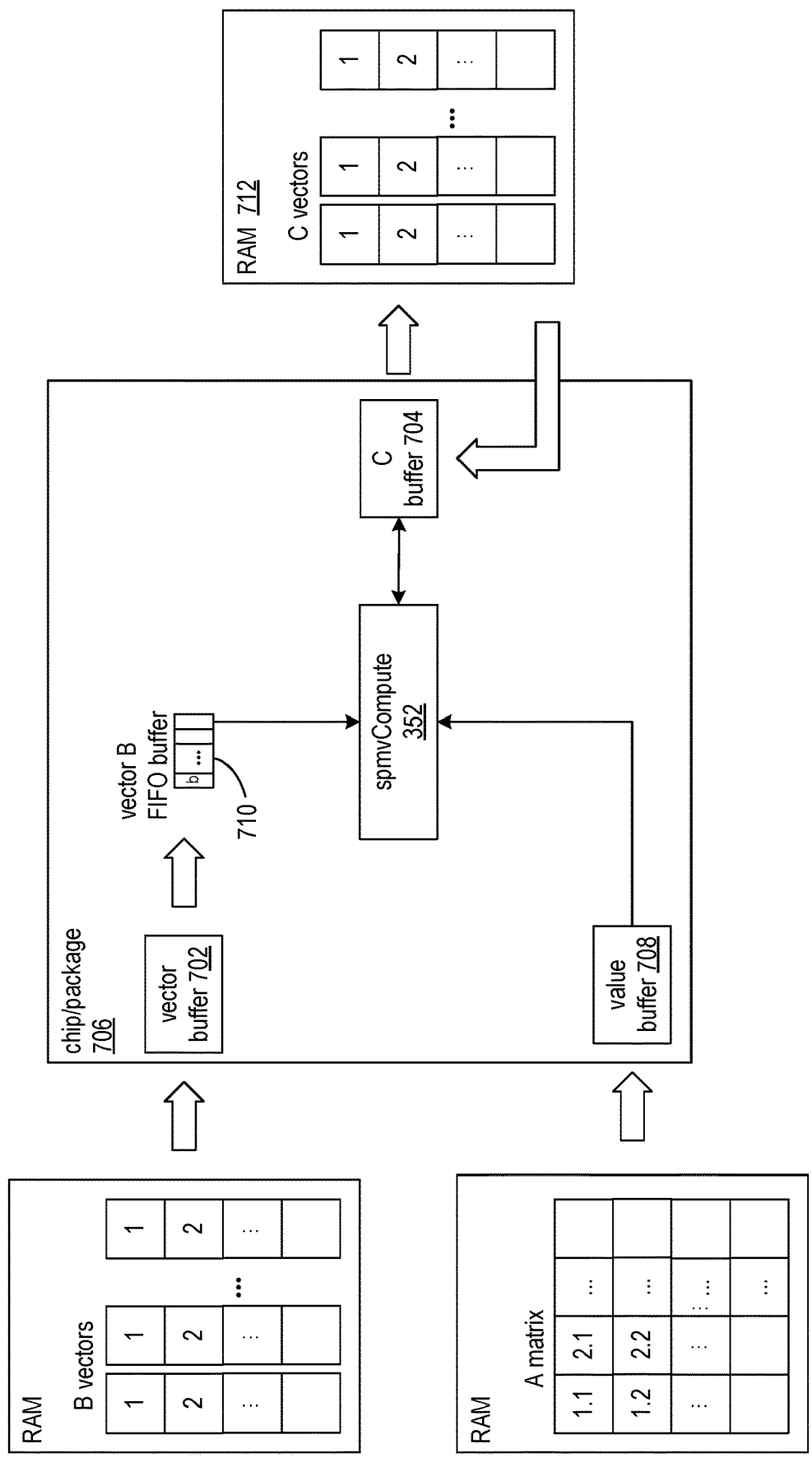
FIG. 15 shows circuitry that supports block-wise partitioning for sparse matrix-dense matrix multiplication.

FIG. 15 shows circuitry that supports block-wise partitioning for sparse matrix-dense matrix multiplication. The input and output vectors are partitioned into blocks and buffered in on-chip memory buffers 702 and 704 of IC chip/package 706. The on-chip vector buffers store multiple blocks from different vectors, such all first blocks from different input/output vectors.

The sparse matrix A can be partitioned along the columns first, and then along the rows. For example, the matrix block labeled "1.2" indicates the column index range of this block is associated with the output vector block 2 (the second output vector block). The blocks of the sparse matrix are loaded into the matrix buffer 708 in the order of row blocks. The vectors from the vector buffer 702 are re-transmitted and streamed into the spmvCompute circuit through the vector FIFO buffer 710 to compute different blocks stored in the C buffer 704. The partially completed output vector is stored in RAM 712 and then loaded into the C buffer 704 for further accumulation.

In the example of FIG. 15, matrix block 1.1 and all first blocks of the input vectors are loaded in the matrix buffer 708 and vector buffer 702. Once loaded, the blocks of input vectors in the buffer 702 are streamed into the spmvCompupte circuit for calculating the first blocks of the output vectors, which are stored in the C buffer 704.

After computation, the partially completed first blocks of the output vectors are stored in RAM 712. In the next iteration, matrix block 1.2 is loaded, and buffer B is re-streamed into the spmvCompute circuit to calculate the second blocks of the output vector, which are buffered in C buffer 704 and then stored back to RAM 712. The process is repeated until all matrix blocks have been loaded and used to compute the output vectors.

Figure 16:
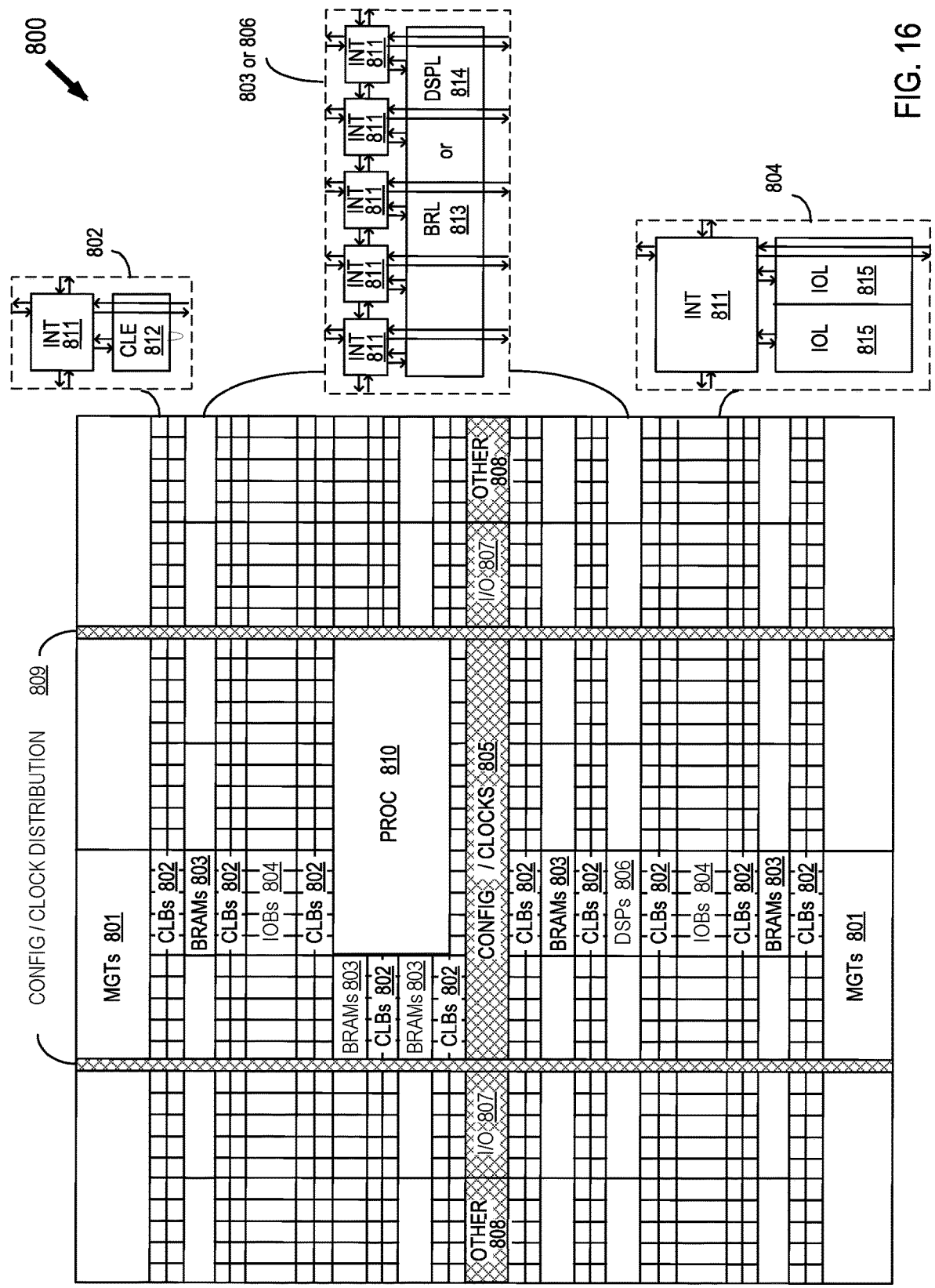
FIG. 16 shows a programmable integrated circuit (IC) on which the disclosed circuits and processes may be implemented.

FIG. 16 shows a programmable integrated circuit (IC) 800 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 16 illustrates programmable IC 800 that includes a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized input/output blocks (I/O) 807, for example, clock ports, and other programmable logic 808 such as digital clock managers, analog-to-digital converters, system monitoring logic, and so forth. Some programmable IC having FPGA logic also include dedicated processor blocks (PROC) 810 and internal and external reconfiguration ports (not shown).

In some FPGA logic, each programmable tile includes a programmable interconnect element (INT) 811 having standardized connections to and from a corresponding interconnect element in each adjacent tile. Therefore, the programmable interconnect elements taken together implement the programmable interconnect structure for the illustrated FPGA logic. The programmable interconnect element INT 811 also includes the connections to and from the programmable logic element within the same tile, as shown by the examples included at the top of FIG. 16.

For example, a CLB 802 can include a configurable logic element CLE 812 that can be programmed to implement user logic, plus a single programmable interconnect element INT 811. A BRAM 803 can include a BRAM logic element (BRL) 813 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 806 can include a DSP logic element (DSPL) 814 in addition to an appropriate number of programmable interconnect elements. An 10B 804 can include, for example, two instances of an input/output logic element (IOL) 815 in addition to one instance of the programmable interconnect element INT 811. As will be clear to those of skill in the art, the actual I/O bond pads connected, for example, to the I/O logic element 815, are manufactured using metal layered above the various illustrated logic blocks, and typically are not confined to the area of the input/output logic element 815.

A columnar area near the center of the die (shown shaded in FIG. 16) is used for configuration, clock, and other control logic. Horizontal areas 809 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 16 include additional logic blocks that disrupt the regular columnar structure making up a large part of the programmable IC. The additional logic blocks can be programmable blocks and/or dedicated logic. For example, the processor block PROC 810 shown in FIG. 16 spans several columns of CLBs and BRAMs.

Note that FIG. 16 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 16 are purely exemplary. For example, in an actual programmable IC, more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for formatting data for matrix multiplication and performing matrix multiplication. Other aspects and features will be apparent to those skilled in the art from consideration of the specification. The circuits and methods may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement comprising:
   memory circuitry including a first plurality of banks configured for storage of column indices, a second plurality of banks configured for storage of row indices, and a third plurality of banks configured for storage of non-zero values of a sparse matrix, wherein the column indices and row indices in corresponding addresses in the first and second pluralities of banks indicate cells of the sparse matrix occupied by the non-zero values in corresponding addresses in the third plurality of banks;
   a pairing circuit configured to distribute an input stream of vector elements across a plurality of first first-in-first-out (FIFO) buffers according to the column indices in the first plurality of banks;
   multiplication circuitry configured to multiply vector elements output from the plurality of first FIFO buffers by corresponding ones of the non-zero values from the third plurality of banks, and configured to store products in a plurality of second FIFO buffers;
   row-aligner circuitry configured to organize each product output from the plurality of second FIFO buffers into one FIFO buffer of a plurality of third FIFO buffers according to a row index corresponding to one of the non-zero values used to generate the product, wherein the row index is indicated by a corresponding one of the row indices in the second plurality of banks; and
   accumulation circuitry configured to accumulate respective totals from products output from the plurality of third FIFO buffers.

2. The circuit arrangement of claim 1, wherein the multiplication circuitry includes a plurality of multiplier circuits coupled between the plurality of first FIFO buffers and the plurality of second FIFO buffers, and each multiplier circuit configured to multiply a vector element from a respective one of the first FIFO buffers by the corresponding one of the non-zero values from second plurality of banks.

3. The circuit arrangement of claim 1, wherein the accumulation circuitry includes a plurality of accumulation circuits coupled to the plurality of third FIFO buffers, respectively, and each accumulation circuit configured to sum the products output from the respective one of the plurality of third FIFO buffers.

4. The circuit arrangement of claim 3, wherein the plurality of third FIFO buffers includes one FIFO buffer per row of the sparse matrix.

5. The circuit arrangement of claim 1, wherein the first plurality of banks, second plurality of banks, and third plurality of banks are equal in number.

6. The circuit arrangement of claim 5, wherein the plurality of first FIFO buffers and the plurality of second FIFO buffers are equal in number to numbers of first plurality of banks, second plurality of banks, and third plurality of banks.

7. The circuit arrangement of claim 1, wherein the row-aligner circuitry is configured to store each product output from each second FIFO buffer and the corresponding row index in a FIFO buffer of a plurality of fourth FIFO buffers.

8. The circuit arrangement of claim 7, wherein the row-aligner circuitry is configured to put each product and corresponding row index output from the plurality of fourth FIFO buffers in one FIFO buffer of a plurality of groups of fifth FIFO buffers based on the corresponding row index.

9. The circuit arrangement of claim 8, wherein the row-aligner circuitry is configured to put each product and corresponding row index output from each fifth FIFO buffer of the plurality of groups of fifth FIFO buffers in one FIFO buffer of a plurality of sixth FIFO buffers based on the corresponding row index.

10. A circuit arrangement comprising:
a load-vector circuit configured to read vector elements from a first memory and put the vector elements in an input vector first-in-first-out (FIFO) buffer; and
one or more instances of a compute circuit coupled to the input vector FIFO buffer, the compute circuit including:
memory circuitry including a first plurality of banks configured for storage of column indices, a second plurality of banks configured for storage of row indices, and a third plurality of banks configured for storage of non-zero values of a sparse matrix, wherein the column indices and row indices in corresponding addresses in the first and second pluralities of banks indicate cells of the sparse matrix occupied by the non-zero values in corresponding addresses in the third plurality of banks;
a pairing circuit configured to distribute the vector elements from the vector FIFO buffer across a plurality of first first-in-first-out (FIFO) buffers according to the column indices in the first plurality of banks;
multiplication circuitry configured to multiply vector elements output from the plurality of first FIFO buffers by corresponding ones of the non-zero values from the third plurality of banks, and configured to store products in a plurality of second FIFO buffers;
row-aligner circuitry configured to organize each product output from the plurality of second FIFO buffers into one FIFO buffer of a plurality of third FIFO buffers according to a row index corresponding to one of the non-zero values used to generate the product, wherein the row index is indicated by a corresponding one of the row indices in the second plurality of banks;
accumulation circuitry configured to accumulate respective totals from products output from the plurality of third FIFO buffers; and
a merge circuit coupled to the accumulation circuitry and configured to output a stream of the respective totals to an output vector FIFO buffer.

11. The circuit arrangement of claim 10, wherein the load-vector circuit is configured to read from the first memory, a dense matrix as successive dense vectors and to put elements of each vector in succession in the input FIFO buffer.

12. The circuit arrangement of claim 10, wherein the one or more instances of the compute circuit is a plurality of instances of the compute circuit coupled in a chain.

13. The circuit arrangement of claim 10, wherein:
the one or more instances of the compute circuit is a plurality of instances of the compute circuit coupled in a chain; and
the load-vector circuit is configured to read from the first memory, a dense matrix as successive dense vectors and to put elements of each vector in succession in the input FIFO buffer (408).

14. The circuit arrangement of claim 10, wherein the multiplication circuitry includes a plurality of multiplier circuits coupled between the plurality of first FIFO buffers and the plurality of second FIFO buffers, and each multiplier circuit configured to multiply a vector element from a respective one of the first FIFO buffers by the corresponding one of the non-zero values from second plurality of banks.

15. The circuit arrangement of claim 10, wherein the accumulation circuitry includes a plurality of accumulation circuits coupled to the plurality of third FIFO buffers, respectively, and each accumulation circuit configured to sum the products output from the respective one of the plurality of third FIFO buffers.

16. The circuit arrangement of claim 15, wherein the plurality of third FIFO buffers includes one FIFO buffer per row of the sparse matrix.

17. The circuit arrangement of claim 10, wherein the first plurality of banks, second plurality of banks, and third plurality of banks are equal in number.

18. The circuit arrangement of claim 17, wherein the plurality of first FIFO buffers and the plurality of second FIFO buffers are equal in number to numbers of first plurality of banks, second plurality of banks, and third plurality of banks.

19. A method comprising:
storing column indices of non-zero values of a sparse matrix in a first plurality of banks of memory circuitry, row indices of the non-zero values in a second plurality of banks of memory circuitry, and the non-zero values in a third plurality of banks of memory circuitry, wherein the column indices and row indices are stored in corresponding addresses in the first and second pluralities of banks and indicate cells of the sparse matrix occupied by the non-zero values in corresponding addresses in the third plurality of banks;
distributing an input stream of vector elements across a plurality of first first-in-first-out (FIFO) buffers according to the column indices in the first plurality of banks;
multiplying vector elements output from the plurality of first FIFO buffers by corresponding ones of the non-zero values from the third plurality of banks;
storing products of the multiplying in a plurality of second FIFO buffers;
putting each product output from the plurality of second FIFO buffers into one FIFO buffer of a plurality of third FIFO buffers according to a row index corresponding to one of the non-zero values used to generate the product, wherein the row index is indicated by a corresponding one of the row indices in the second plurality of banks; and
accumulating respective totals from products output from the plurality of third FIFO buffers.

20. The method of claim 19, wherein the multiplying includes multiplying in parallel by a plurality of multiplier circuits coupled between the plurality of first FIFO buffers and the plurality of second FIFO buffers, vector elements from respective ones of the first FIFO buffers by the corresponding ones of the non-zero values from second plurality of banks.

\* \* \* \* \*